US005576789A

United States Patent [19]
Patton

[11] Patent Number: 5,576,789
[45] Date of Patent: Nov. 19, 1996

[54] FILM REWINDING AND FILM CASSETTE UNLOADING DEVICE AND METHOD OF USE

[75] Inventor: David L. Patton, Webster, N.Y.

[73] Assignee: Eastman Kodak Company, Rochester, N.Y.

[21] Appl. No.: 411,139

[22] Filed: Mar. 27, 1995

[51] Int. Cl.⁶ ..................................... G03B 1/00
[52] U.S. Cl. .................... 396/418; 396/538; 396/388; 396/387
[58] Field of Search ................................... 354/214, 212, 354/275, 173.1, 173.11, 295, 288

[56] References Cited

U.S. PATENT DOCUMENTS

| | | | |
|---|---|---|---|
| 3,999,197 | 12/1976 | Iwashita et al. | 354/173 |
| 4,006,489 | 2/1977 | Aizawa et al. | 354/214 |
| 4,306,794 | 12/1981 | Fukahori et al. | |
| 4,522,477 | 6/1985 | Iwashita et al. | |
| 4,967,216 | 10/1990 | Nishio et al. | 354/173.1 |
| 5,287,136 | 2/1994 | Kitagawa et al. | 354/173.1 |
| 5,298,930 | 3/1994 | Asakura et al. | 354/173.1 |
| 5,341,187 | 8/1994 | Kurei | 354/173.11 |
| 5,440,364 | 8/1995 | Takahashi | 354/173.1 |
| 5,477,295 | 12/1995 | Lawther et al. | 354/174 |

Primary Examiner—Michael L. Gellner
Assistant Examiner—Christopher E. Mahoney
Attorney, Agent, or Firm—Peter J. Bilinski

[57] ABSTRACT

An apparatus for use with a camera having a lighttight body compartment for retaining a film cassette having a film spool, in which the lighttight body compartment includes a detachable portion. The apparatus includes a sensing member for sensing the camera as it is attached to the apparatus, a spool driving element for engaging an exposed spool end of a cassette film spool, and a pair of pin members which engage and release the detachable portion of the camera body. According to the present invention, a control module automatically controls the action of a drive motor to cause the spool driver to engage the film spool end to wind the film into the cassette. After a predetermined time period has elapsed insuring all of the film is wound, the detachable portion of the camera body is automatically removed by engagement of the pin members and the film cassette is removed from the camera body.

22 Claims, 8 Drawing Sheets

FILM REWINDING AND FILM CASSETTE UNLOADING DEVICE AND METHOD OF USE

FIELD OF THE INVENTION

The invention relates generally to the field of photography, and in particular to still photographic cameras. More specifically, the invention relates to an apparatus which sequentially and automatically winds residual film into a film cassette and unloads the wound film cassette from a prewind camera, as well as a related method for using the apparatus.

BACKGROUND OF THE INVENTION

With current single-use (also referred to as one-time use) cameras, when the camera is returned by the customer to the photofinisher the film is usually not fully rewound into the film cassette. In order to accomplish this, the operator must manually turn the film winding knob and/or depress the shutter release button. The result is that the remainder of the film is exposed. The exposure of the residual film creates two potential problems.

The first problem created is that additional time and effort are required in order to rewind the film into the film magazine and/or trip the shutter. The second problem is that the film which has been exposed by the operator is also processed and printed by the photofinisher, thereby creating unnecessary waste and potential dissatisfaction.

There is a need for a device which will easily rewind residual film into a loaded film cartridge without creating unnecessary exposures, and for automatically unloading the film cartridge from the camera.

SUMMARY OF THE INVENTION

The present invention is directed to overcoming one or more of the problems set forth above. Briefly summarized, according to one aspect of the present invention, there is provided an apparatus for use with a camera having a lighttight body compartment sized for retaining a film cassette, said apparatus having film winding means for engaging an exposed end of a film spool of a loaded film cassette for winding film into said film cassette, characterized by:

film cassette unloading means for opening a detachable portion of said body compartment and allowing extraction of said film cassette from the camera after the film winding means has wound all the film into the cassette.

According to another aspect of the present invention, there is provided an apparatus for use with a camera for automatically rewinding film into a film cassette and unloading the cassette from a camera body, said apparatus comprising:

drive means capable of selectively engaging a rotatable film spool of said film cassette for rotating said spool in a film winding direction to wind film into said cassette and a detachable portion of said camera for opening said detachable portion for releasing said cassette from said camera body; and control means connected to said drive means for engaging said drive means with the detachable portion of said camera after all of the film outside of the cassette has been wound into said cassette.

In a preferred embodiment, the film cassette unloading means includes a pair of engagement members attached to a rotatable plate which engages and automatically opens a detachable portion of the lighttight film compartment after the film winding means has first rewound all of the film into the film cassette. The apparatus includes control means for enabling the film winding means to automatically engage the film spool of a loaded film cassette in order to rewind residual film into the cassette after a camera body containing the cassette has first been mounted to the apparatus.

According to another aspect of the present invention, there is provided a method of unloading a film cassette from a camera body, comprising the steps of:

attaching a camera body to an apparatus having drive means for selectively engaging a detachable portion of said body and a rotatable film spool of said cassette contained in said body;

engaging the drive means with an end of said film spool and rotating said spool in a film winding direction for winding film into said cassette;

engaging the drive means with said detachable portion of said body;

activating said drive means so as to detach said detachable portion from said camera body; and, unloading said film cassette from said camera body by removing said body from said apparatus.

Preferably, the drive means is disengaged from engagement with the film spool after all the film outside the cassette has been wound into the cassette. According to a preferred embodiment, the control means disengages the film winding of the film spool after a predetermined time measured by a timer or other means, and automatically engages the drive means for detaching the detachable portion for allowing extraction of the film cassette.

An advantageous aspect of the present invention is that residual film can be automatically wound into a film cassette and the film cassette can be removed from a camera body in an expeditious manner without requiring additional exposure of the film or manual winding of the film.

Another advantageous aspect of the present invention is that film cassettes can be repeatably unloaded from the camera manner without damage to the camera, promoting the recyclability of one-time use cameras using the described device.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

Figure 1:
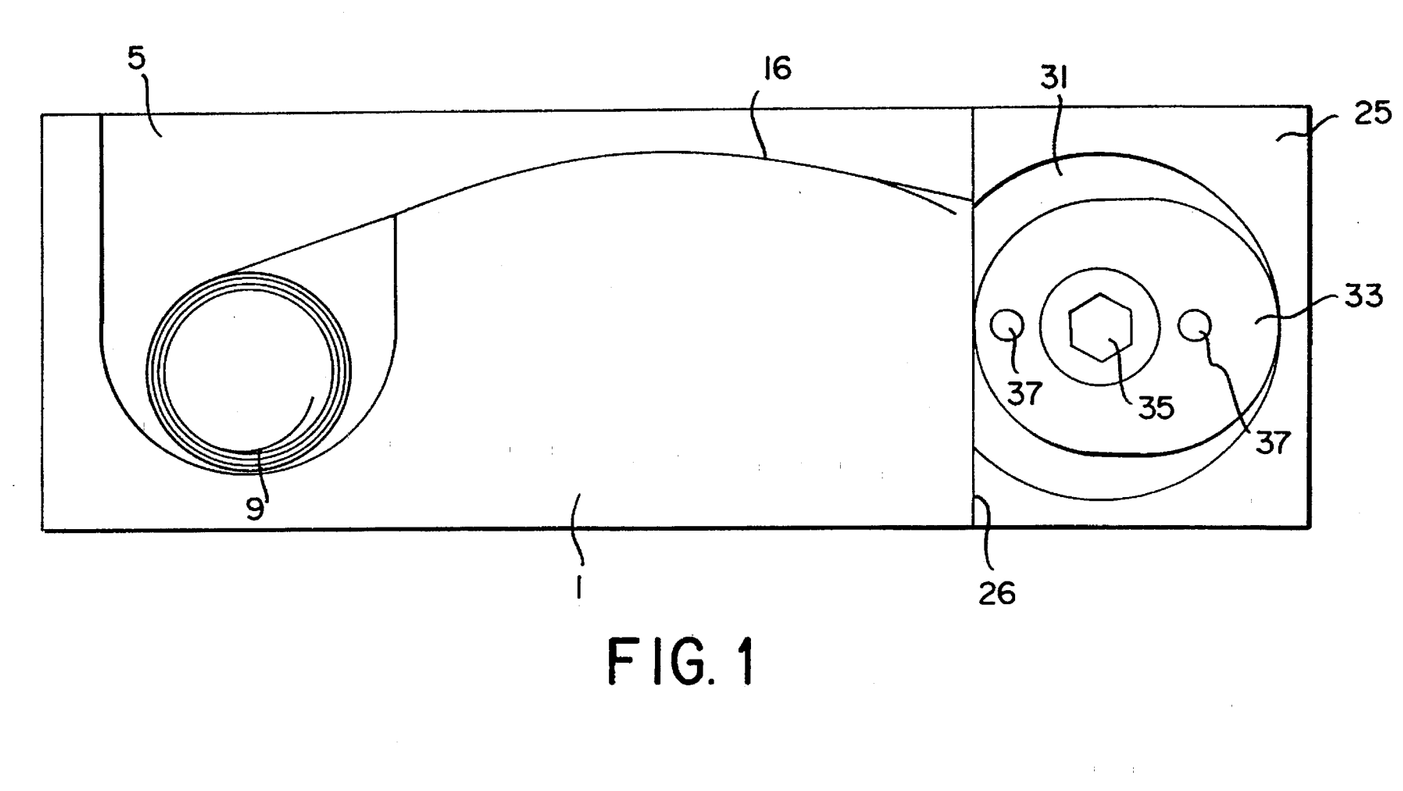
FIG. 1 is a partial cutaway bottom view of a single use camera used in accordance of a preferred embodiment of the present invention.
Figure 2:
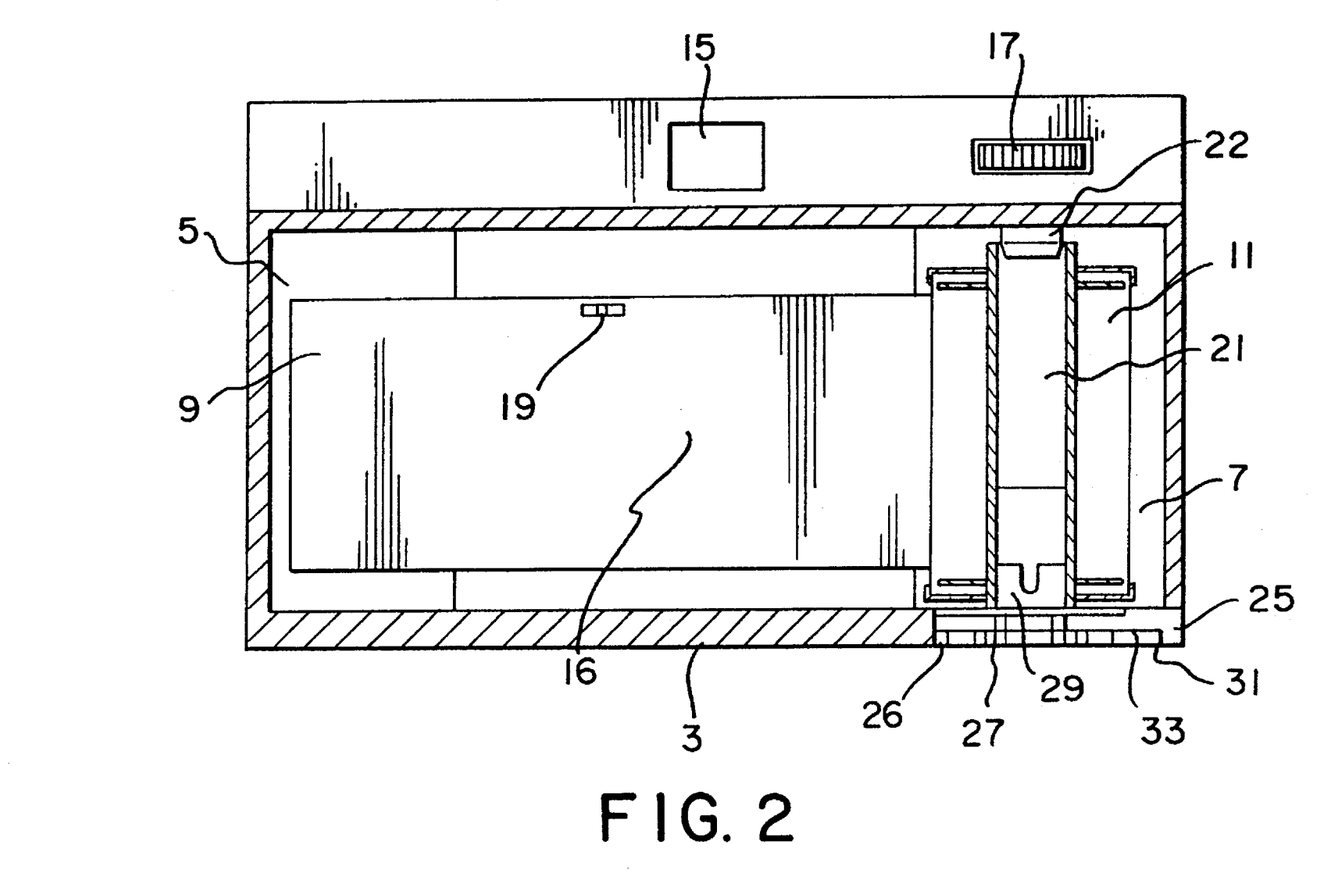
FIG. 2 is a back view of the single-use camera depicted in FIG. 1.

Beginning with FIGS. 1 and 2, there is shown a single use camera 1 comprising a plastic body 3 having a molded film supply cavity 5 and a cartridge chamber 7 for containing a film roll 9 and a film cassette 11, respectively. The camera 1 also includes a taking lens 13, FIG. 5, mounted to the front of the body 3 as well as a viewfinder 15. A rotatable film advance wheel 17 advances film 16 in a conventionally known manner after an exposure has been taken by means of a metering mechanism including a film sprocket 19, causing the film 16 to be wound from the film roll 9 into the cassette 11.

The film cassette 11 includes a film spool 21 onto which the film 16 is wound as exposed in the camera 1. One end of the film spool 21 is attached to a film drive spindle 22 which rotatably engages the film spool for film winding by the film advance wheel 17. The remaining end of the spool 21 is attached to a spool engagement end 29 which extends through the bottom of the camera 1. The film roll 9 is prewound, preferably from the film cassette 11, and is disposed in the film supply cavity 5 for advancement across an camera aperture gate 13, FIG. 6. Each of the above features are commonly known in the field, are typically found on photographic still cameras and provide an illustrative background for the present invention which follows. Therefore, additional discussion of these features is not required in the context of the present invention.

The bottom of the cartridge chamber 7 contains a detachable portion 25 which is, according to this embodiment, snap-fitted to a side edge 26 of the camera body 3. The detachable portion 25 is sized to cover the bottom of the cartridge compartment 7 and contains an opening 27 through which extends the spool engagement end 29. A cam plate 33 is positioned within a somewhat circularly shaped recess 31 in the exterior of the detachable portion 25 having a pair of small cam drive holes 37 which are equally from a larger opening 35, which like opening 27 engages the spool engagement end 29. Each of the openings 27, 35 are coaxial and are sized to tightly accommodate the spool engagement end 29 which is also rotatable. The tight positioning of the end 29 and the openings 27, 35 assures the lighttightness of the camera is maintained.

The cam plate 33 is elliptically shaped and is rotatable within the recess 31. the diameter of the circular recess 31 is equal according to this embodiment to the major dimensions of the elliptically shaped cam plate to provide a tight fit. The drive holes 37 and the opening 35 are eccentrically arranged on the cam plate 33 for reasons described below.

Figure 3:
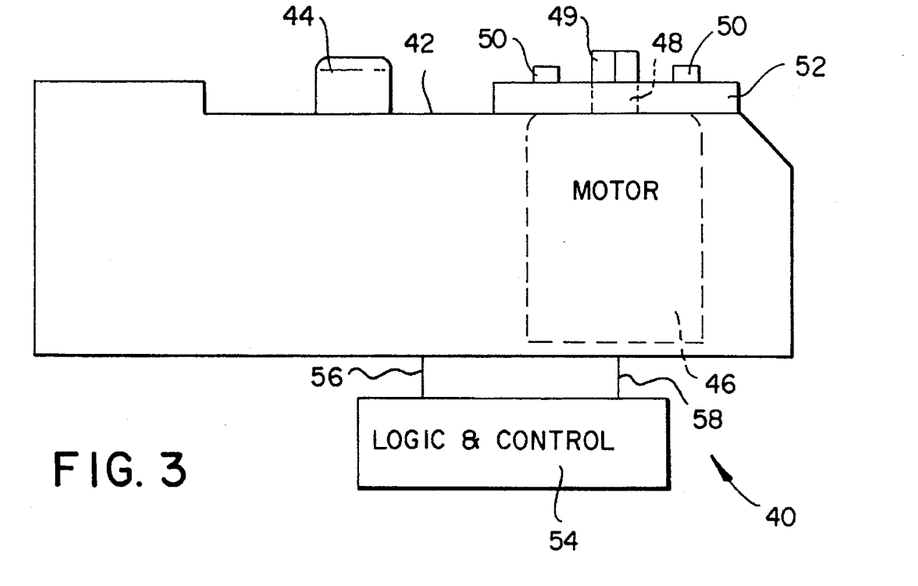
FIG. 3 is a schematic drawing of a single use camera rewinding and removal device according to a first embodiment of the present invention.
Figure 4:
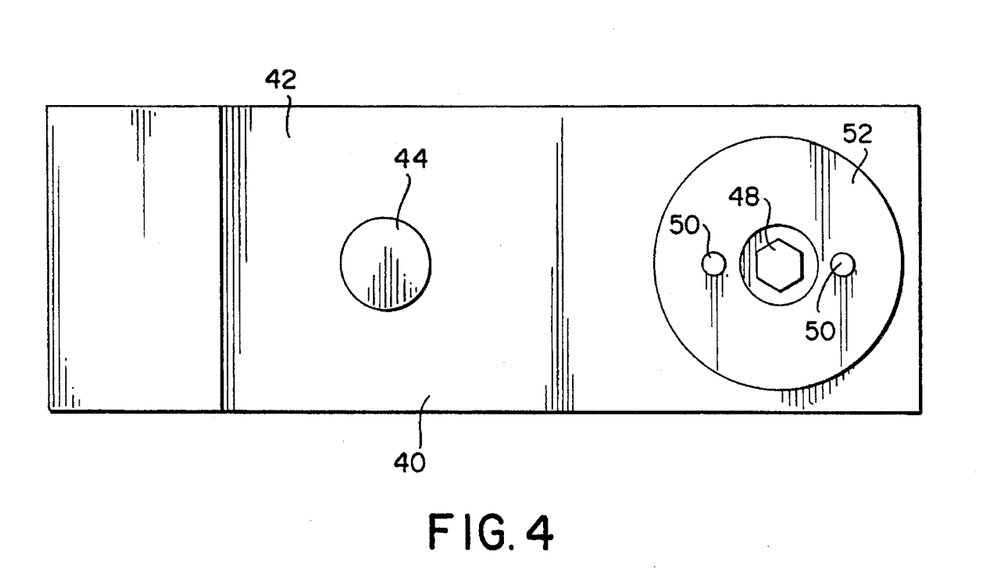
FIG. 4 is a top view of the film rewinding and film cassette removal device of FIG. 3.

A preferred embodiment of a film rewinding and cassette unloading device 40 used in conjunction with the camera of FIGS. 1 and 2 is shown in FIGS. 3 and 4. The device 40 includes a top surface 42. A drive motor 46 (shown in phantom in FIG. 3) contained within the device 40 includes an output shaft 48 which extends through a rotatable plate 52. The exposed spool driver end 49 of the output shaft 48 includes a driving head geometry which is configured to fit within the spool engagement end 29, see FIG. 1. A pair of engagement pin members 50 extend from the top of the rotatable plate 52 and are spaced the same distance from one another as the drive holes 37 on the cam plate 33 for engagement therewith. The spool driver 49 and the rotatable plate 52 are separately engageable by the drive motor 46, as described below, for selectively engaging the camera body 3, and specifically the spool engagement end 29 and the cam plate 33.

An actuation switch 44 is positioned on the top surface 42 of the device 40 and is directly connected via wires 56, 58 to a logic and control module 54, such as a microprocessor or similar control type device contained within the device 40. In the views depicted, the module 54 is shown outside the body of the device 40 for the sake of clarity.

Referring now to FIGS. 5–9, a rewinding and film cassette unloading operation is described using the device 40. Initially, the bottom side of a described camera 1 is mounted to the top surface 42 of the device. The camera 1 is positioned such that the spool driver 49 is engaged with the spool engagement end 29 and the cam pins 50 of the rotatable plate 52 are positioned in the drive holes 37 of the cam plate 33. Preferably, the cartridge compartment side of the camera 1 is attached to the device 40 first while the remainder of the camera body 3 is tilted so that it is not in contact with the top surface 42.

Figure 5:
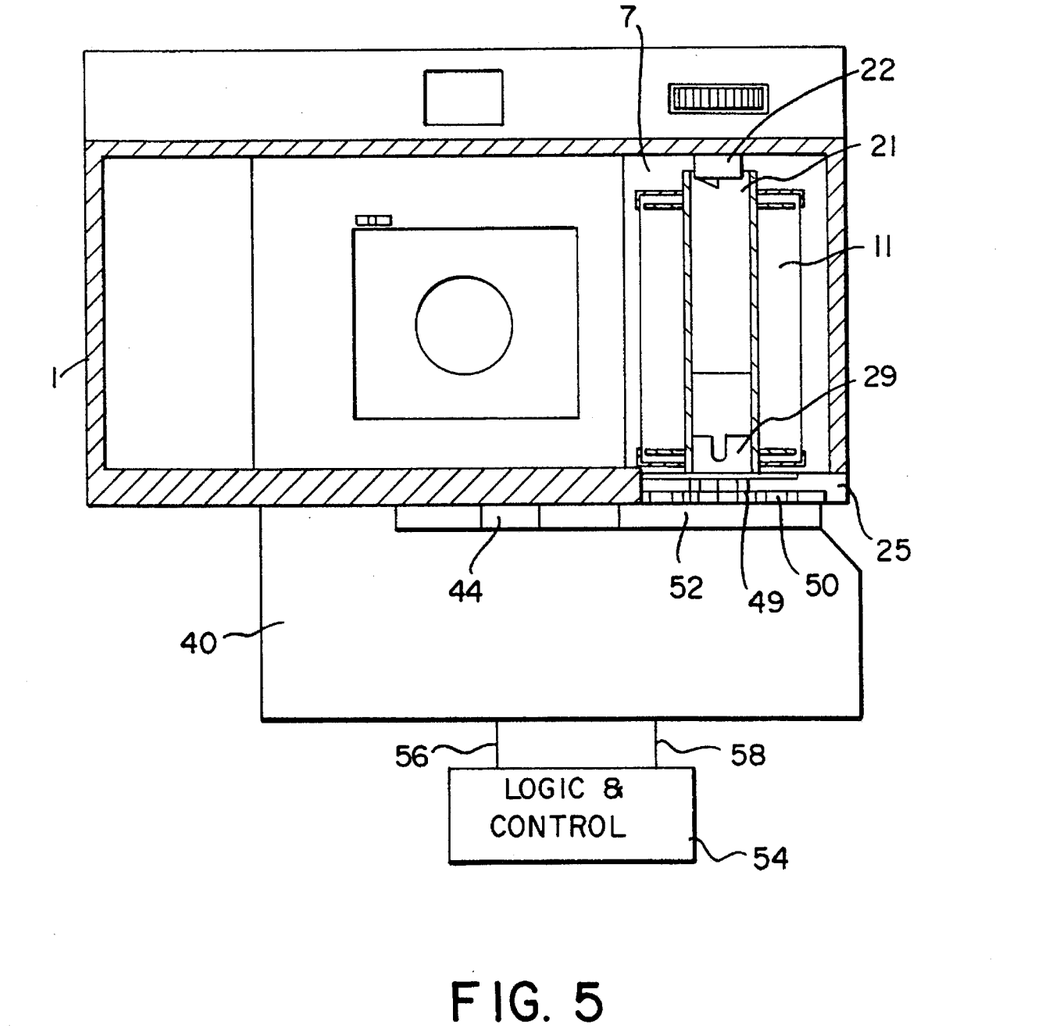
FIG. 5 is a side elevational view of the single-use camera of FIGS. 1–2, as attached to the device showing the rewinding of film into the cassette.

After the cartridge compartment side of the camera is mounted to the drive portion of the device 40, the remainder of the camera body 3 is positioned on the top surface 42, tripping the actuation switch 44 and causing the logic and control module 54 to activate the drive motor 46, FIG. 3, which is interconnected to the spool driver 49. The control module 54 sends a signal to the drive motor 46, causing the spool driver 49 to rotate in a counterclockwise direction, according to this embodiment. The spool driver 49 cooperates to engage the spool engagement end 29, thereby rotating the film spool 21 and winding residual film (if any) into the confines of the film cassette 11.

Preferably, the logic and control module 54 includes a delay or timer circuit which is activated when the actuation switch 44 is first tripped, or alternately upon actuation of the drive motor 46. After enough time (approximately 1 to 60 seconds) has elapsed for the film 16, FIG. 1, to be completely rewound into the cassette 7, the logic and control module 54 stops the spool driver 49. Alternatively, instead of using a timer, an optosensor (not shown) or other sensing means can be provided within the confines of the camera body adjacent the film cassette 11 for sensing the presence of film 16 outside the cassette which is interconnected to the logic and control module 54.

Figure 6:
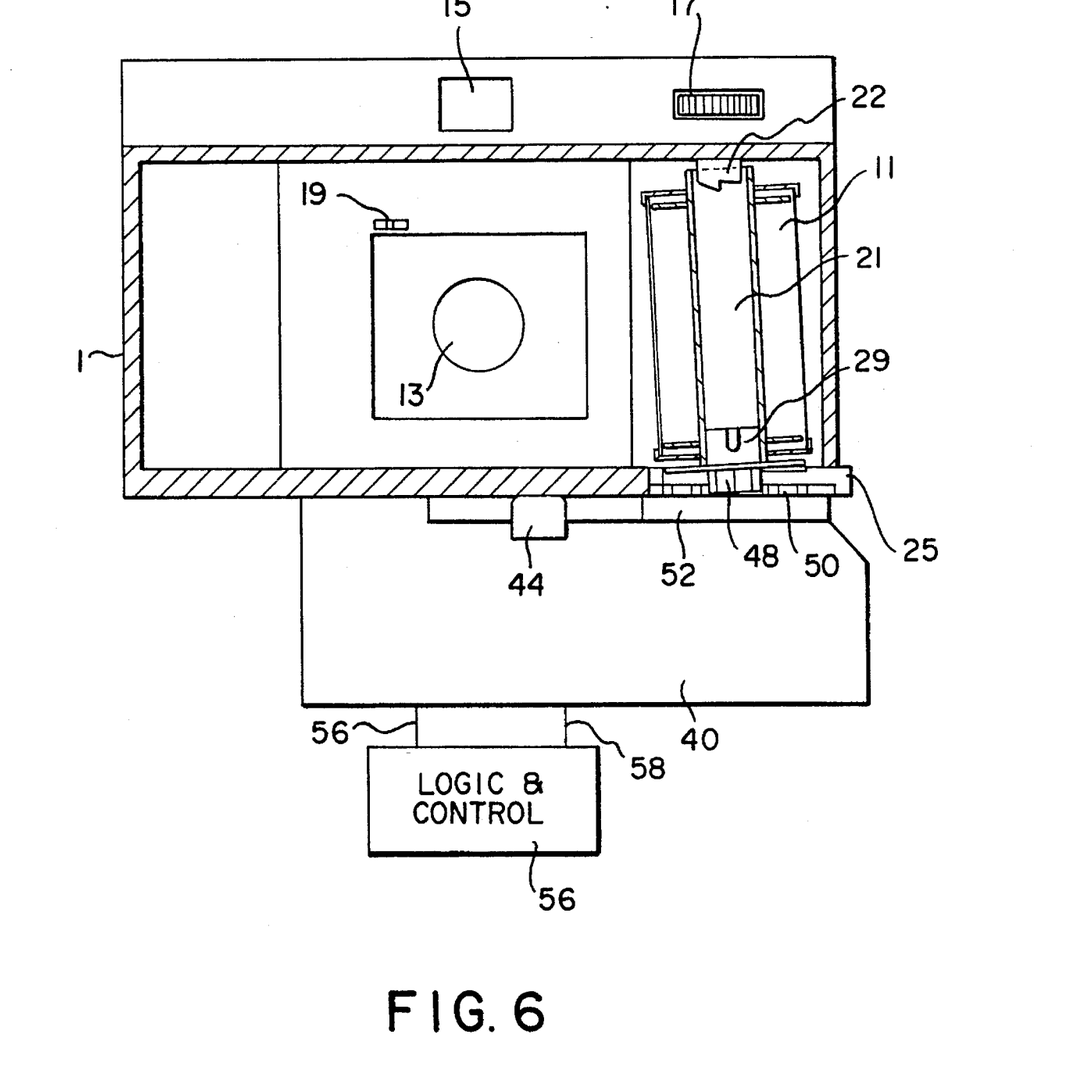
FIG. 6 is the side elevational view of FIG. 5 showing the removal of the film cassette from the camera of FIGS. 1 and 2.
Figure 7:
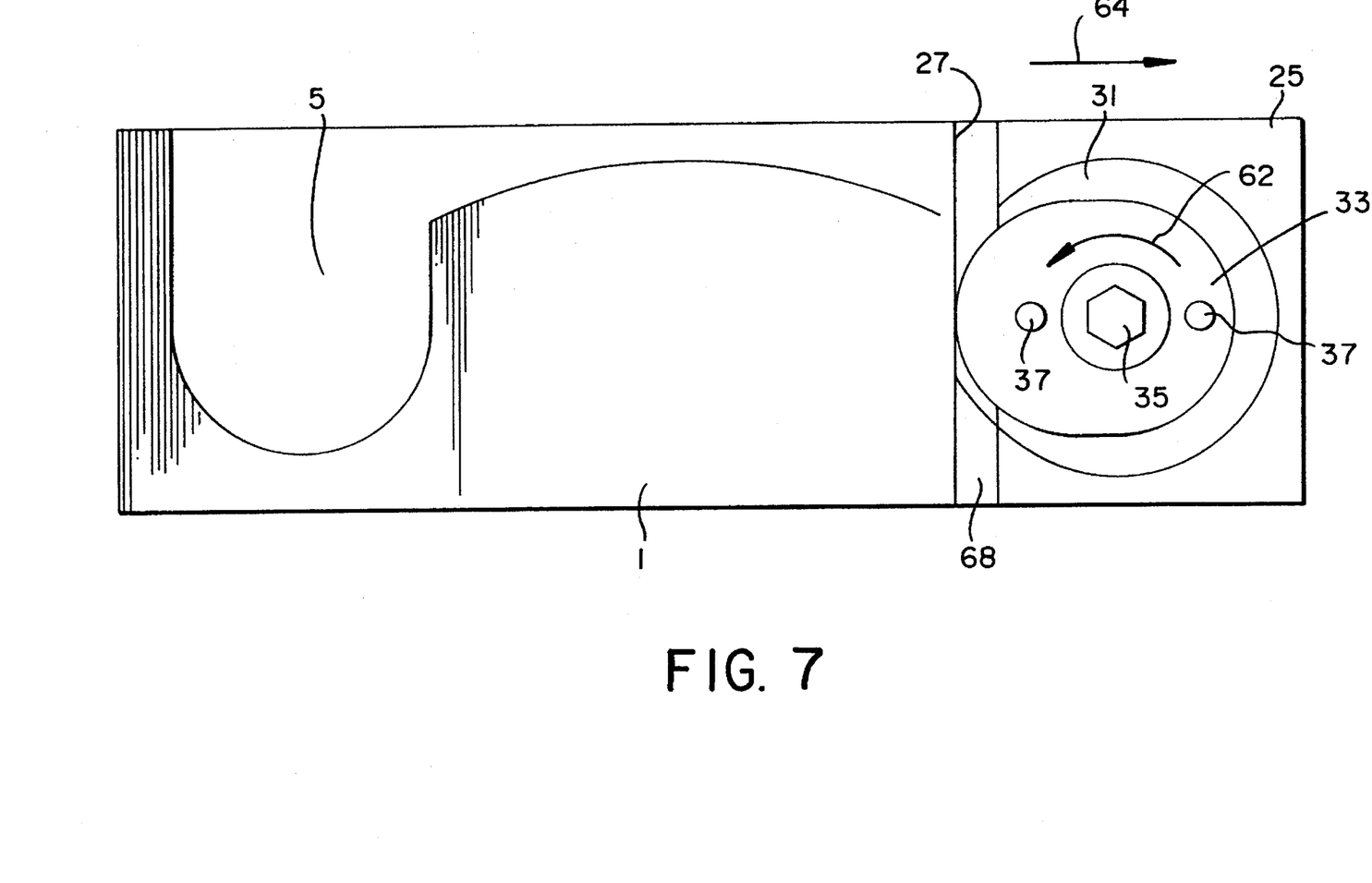
FIG. 7 is the bottom partial cutaway view of the single-use camera shown in FIG. 1 showing the detachment of the cartridge door of the camera.

Referring to FIGS. 6 and 7, and once the predetermined period of time has elapsed, the logic and control module 54 is programmed to reactivate the drive motor 46 to automatically engage the interconnected cam plate driver by rotating the rotatable plate 52 in a counterclockwise direction (according to this embodiment), indicated by arrow 62. The rotatable plate 52 can be directly connected to a second drive motor (not shown), or according to this embodiment, to the output of the same drive motor 46 by means of an electric clutch (not shown) which is separately engageable by the logic contained in the control and logic module 54. Alternatively, the spool driver 49 can remain engaged and powered with the spool engagement end 29 during the detachment sequence which follows. The rotatable plate 52 drives the opening of the detachable portion 25 via the engagement of the pin-shaped engagement members 50 with the drive holes 37 of the eccentrically shaped cam plate 33.

The control and logic module 54 is programmed to rotate the rotatable plate 52 in a counterclockwise direction by approximately 180 degrees (or ½ turn) by activation of the drive motor 46 through the electric clutch (not shown) or other known engagement means. The engagement between the cam plate 33 and the eccentrically positioned engagement pins 50 of the rotatable plate 52 causes the cam plate 33 to similarly rotate in a counterclockwise direction, arrow 62, about the opening 35 which separates the equally spaced drive holes 37. The rotation of the cam late 33, FIG. 7, causes the larger side of the cam plate to be brought into contact with the side edge 26 of the camera body 3, and being smaller than the circular recess 31 due to the eccentricity of the drive holes 37 causes the cam plate to act as a cam surface against the side edge, releasing the snap attachments (not shown) of the detachable portion 25 from the camera body 3. The detachable portion 25 is translated away from the side edge 26 in the direction shown, arrow 64, by a distance indicated by space 68, equivalent to the larger space subsumed by the cam plate 33. In addition, and due to the placement of the spool engagement end 29, the lateral movement of the detachable portion 25 causes the spool engagement end 29 and the attached film cassette 7 to also be shifted laterally, thereby moving the cassette 11 to a tilted position as shown, dislodging the remaining spool end from the film drive spindle 22.

The cassette chamber 7 of the camera body 3 is preferably sufficiently large enough in diameter to allow the film cassette 7 to be tilted in the manner shown.

Figure 8:
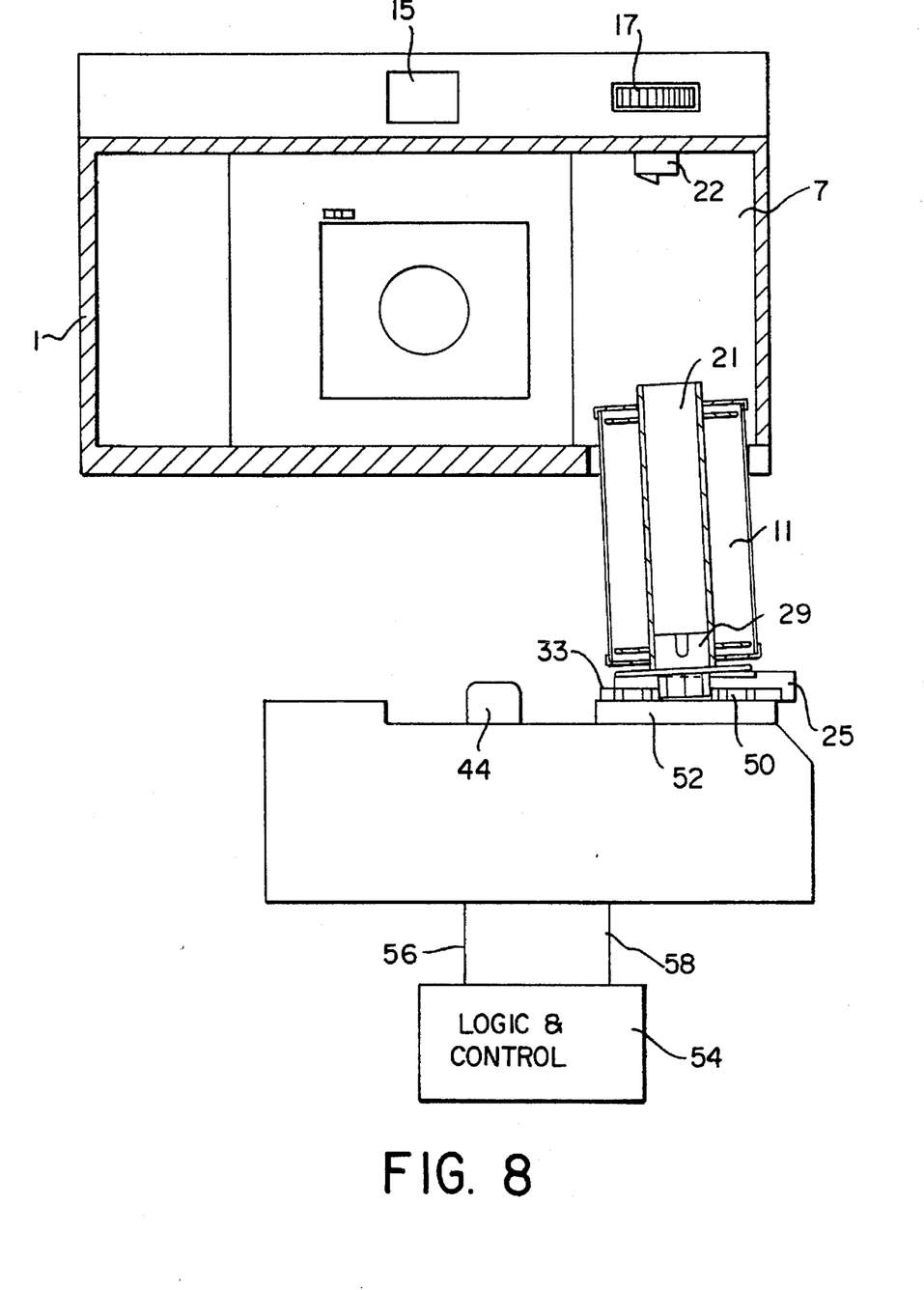
FIG. 8 is the side elevational view of the camera and device as shown in FIG. 6 showing the removal of the cassette from the camera; and, FIG. 9 is the side elevational view of FIG. 8 showing the removed cassette.

FIG. 8 shows the removal of the single use camera 1 from the film rewinding and cassette unloading device 40. As the camera body 3 is lifted away from the device 40 by the operator or by automated means, as shown, the detachable portion 25 of the camera body 3, the rotatable plate 52 with pin members 50, remaining engaged with the drive holes 37 and the spool engagement mechanism 49 with the film cassette 7 all remain attached.

Figure 9:
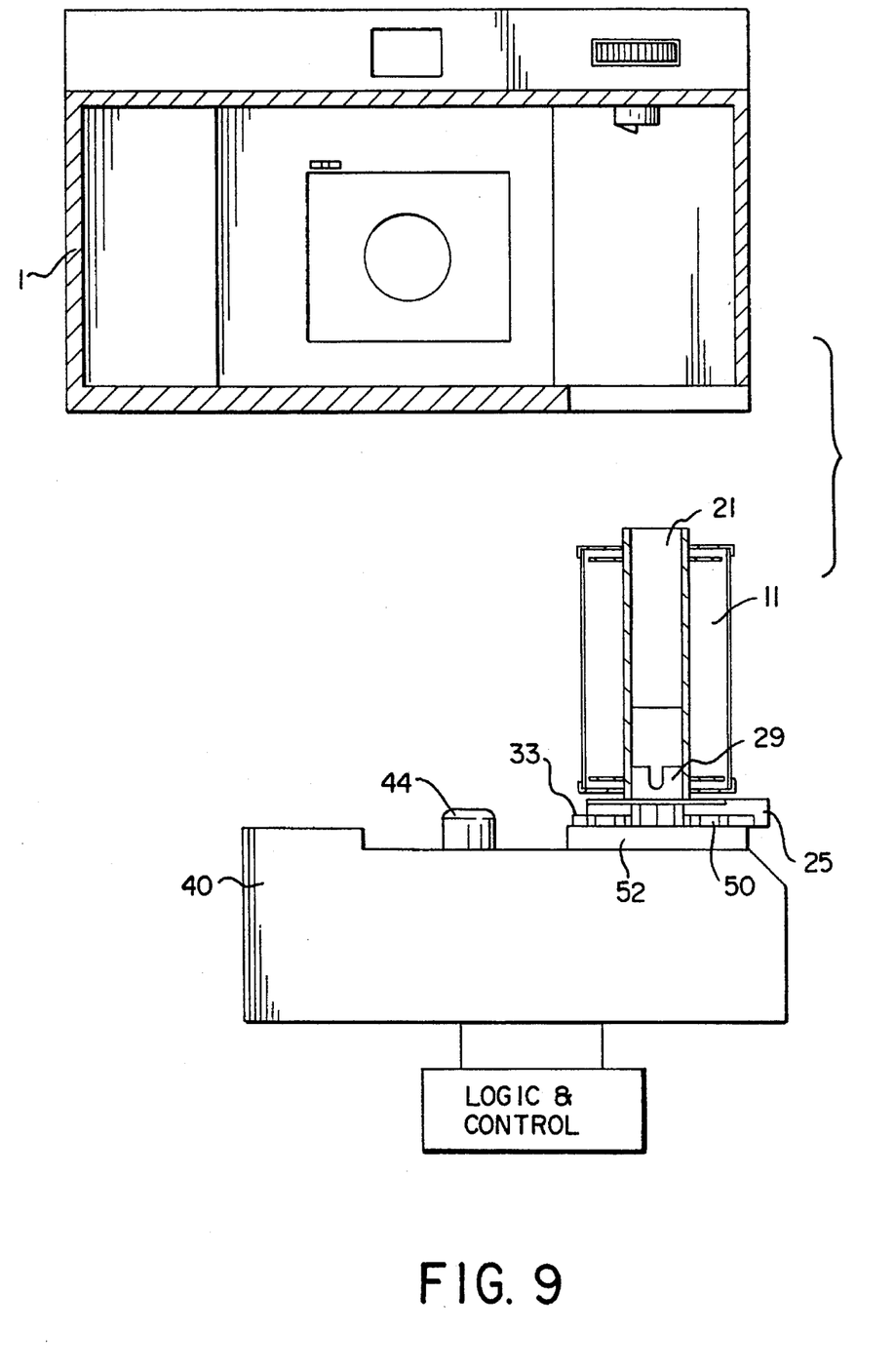

Referring to FIG. 9, after the single-use camera 1 has been lifted free from the device 40, the operator can easily remove the film cassette 7 from the rotatable plate 52, and separate the film cassette from the detachable portion 25, the cam plate 33, and the spool engagement mechanism 49. The film cassette 11 can be sent for processing of the contained film 16. The detachable portion 25 including the cam plate 33, and the spool driver end 49 can, in the meantime, be removed from the rotatable plate 52.

Another single-use camera (not shown) including a loaded film cassette which is ready to be removed from the lighttight camera body can then be mounted to the device 40. A similar procedure can then be initiated in order to automatically rewind any unused film, break open the lighttight film compartment, and unload the film cassette from the camera body.

The invention has been described with reference to a preferred embodiment. However, it will be appreciated that variations and modifications can be effected by a person of ordinary skill in the art without departing from the scope of the invention.

PARTS LIST FOR FIGS. 1–9

1 single use camera
3 body
5 film supply cavity
7 film cartridge compartment
9 film roll
11 film cassette
13 taking lens
15 viewfinder
16 film
17 film advance wheel
19 sprocket
21 take-up spool
22 film drive spindle
25 detachable portion
26 side edge
27 opening
29 spool engagement end
31 recess
33 cam plate
35 opening
37 drive holes
40 film winding and film cassette unloading device
42 top surface
44 switch
46 drive motor
48 output shaft
49 spool driver
50 cam engagement pins
52 rotatable plate
54 logic and control module
56 wire
58 wire
62 arrow
64 arrow
68 space

I claim:

1. An apparatus for use with a camera having a lighttight body compartment sized for retaining a film cassette, comprising:

film winding means for engaging a film spool of a film cassette contained in said lighttight body compartment for winding film into said film cassette, is characterized in that:

said apparatus includes film cassette unloading means for engaging said lighttihgt body compartment and for automatically opening a detachable portion of said lighttight body compartment to allow extraction of said film cassette and said detachable portion from the camera after the film winding means has wound all the film into the cassette.

2. An apparatus as recited in claim 1, including control means connected to said film winding means for automatically enabling said film winding means to wind residual film into said cassette after said camera has been mounted to said apparatus.

3. An apparatus as recited in claim 2, including timer means connected to said control means and said film winding means for enabling said control means to stop said film winding means after a predetermined period of time has elapsed.

4. An apparatus as recited in claim 3, wherein said control means is a microprocessor having means for activating said film cassette unloading means after said predetermined period of time has elapsed.

5. An apparatus as recited in claim 3, further comprising sensing means connected to said control means including an actuatable switch member which is automatically activated when a camera is mounted to said apparatus.

6. An apparatus as recited in claim 5, including drive means for engaging said detachable portion of an attached camera, said drive means comprising:

a drive motor;

a rotatable plate connected to said drive motor, said rotatable plate including a pair of pin-shaped engagement members for engaging said detachable portion.

7. An apparatus as recited in claim 6, wherein said detachable portion of said camera body includes a pair of apertures sized to receive said pin-shaped engagement members.

8. An apparatus as recited in claim 7, wherein said detachable portion includes an aperture for receiving an end portion of said cassette film spool extending from said camera body and by which the cassette is attached to said detachable portion.

9. An apparatus as recited in claim 8, wherein said film cassette unloading means includes a rotatable spool driving element connected to said drive means and sized for engaging said film spool end portion and which cooperates with said pin-shaped engagement members to open said detachable portion and remove said cassette from said camera body.

10. An apparatus as recited in claim 1, wherein said camera is a single-use camera.

11. A method of unloading a film cassette from a camera body, comprising the steps of:

attaching a lighttight camera body to an apparatus having drive means for selectively engaging a detachable portion of said lighttight body and a rotatable film spool of said cassette contained in said lighttight body;

engaging the cassette film spool with said drive means and rotating said spool in a film winding direction to wind film into said cassette;

engaging said drive means with said detachable portion of said lighttight body so as to detach said detachable portion from said camera body and render the body non-lighttight; and removing said camera body from said apparatus, thereby unloading said film cassette and said detachable portion, each of which remain attached to said apparatus after said camera body is removed.

12. A method as recited in claim 11, including the step of sensing the presence of said camera when said camera is attached to said apparatus.

13. A method as recited in claim 11, including the step of disengaging said drive means from said film spool after all the film outside the cassette has been wound into said cassette.

14. A method as recited in claim 13, including the step of disengaging said drive means from said film spool after a predetermined time, said apparatus including timing means for measuring said predetermined time.

15. A method as recited in claim 11, including the additional steps of:

removing said cassette and said detachable portion from said apparatus;

sequentially placing at least one additional camera body onto the apparatus;

engaging said drive means with said film spool and rotating said film spool in a film winding direction to wind film into said cassette;

engaging said drive means with said detachable portion after all of the film has been wound into the cassette;

opening said detachable portion to render the camera body non-lighttight; and removing said at least one additional camera body from said apparatus, leaving said rewound film cassette and said detachable portion on said apparatus.

16. Apparatus for use with a camera for automatically rewinding film into a film cassette and unloading said film cassette from a lighttight camera body, comprising:

drive means capable of selectively engaging a rotatable film spool of said film cassette for rotating said spool in a film winding direction to wind film into said cassette and a detachable portion of said camera, is characterized by:

control means for automatically engaging said drive means with said detachable portion of said camera body after all of the film outside of the cassette has been wound into said cassette to release said detachable portion from said camera body, and retaining means for retaining said film cassette and said detachable portion after said detachable portion has been released by said drive means and said camera body has been removed from said apparatus.

17. An apparatus as recited in claim 16, including timer means for disengaging said drive means from said film spool after all the film outside the cassette has been wound into said cassette.

18. An apparatus as recited in claim 17, wherein said detachable portion includes camming means engaged with said camera body and said drive means for camming against said detachable portion to release said detachable portion from said camera body upon engagement by said drive means.

19. An apparatus as recited in claim 16, including sensing means for sensing the presence of a camera mounted to said apparatus, said sensing means being cooperative with said control means for automatically engaging said drive means with said film spool after a camera has been attached to said apparatus.

20. An apparatus as recited in claim 19, wherein said sensing means includes an actuatable switching member movable from a first position to a second position when a camera body is attached to said apparatus.

21. An apparatus as recited in claim 16, wherein said drive means includes a rotatable spool engagement member sized for engaging a cartridge film spool, at least one engagement member attached to a rotatable plate for engaging said detachable portion of said camera body, and a drive motor connected to said spool driver and said rotatable plate.

22. Apparatus as recited in claim 16, wherein said camera is a single-use camera having a film cassette chamber for containing said film cassette.

* * * * *